United States Patent
Itoh et al.

(10) Patent No.: US 12,157,459 B2
(45) Date of Patent: Dec. 3, 2024

(54) MANAGER, CONTROL METHOD, NON-TRANSITORY STORAGE MEDIUM, AND VEHICLE

(71) Applicant: TOYOTA JIDOSHA KABUSHIKI KAISHA, Toyota (JP)

(72) Inventors: Nobuyuki Itoh, Toyota (JP); Kazuki Miyake, Toyota (JP); Akitsugu Sakai, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 289 days.

(21) Appl. No.: 17/591,112

(22) Filed: Feb. 2, 2022

(65) Prior Publication Data
US 2022/0266819 A1    Aug. 25, 2022

(30) Foreign Application Priority Data
Feb. 19, 2021  (JP) ................. 2021-025568

(51) Int. Cl.
| | |
|---|---|
| B60W 30/06 | (2006.01) |
| B60W 30/18 | (2012.01) |
| B60W 40/10 | (2012.01) |
| B60W 50/10 | (2012.01) |
| B60W 10/04 | (2006.01) |
| B60W 10/18 | (2012.01) |

(Continued)

(52) U.S. Cl.
CPC ...... B60W 30/06 (2013.01); B60W 30/18109 (2013.01); B60W 40/10 (2013.01); B60W 50/10 (2013.01)

(58) Field of Classification Search
None
See application file for complete search history.

(56) References Cited

U.S. PATENT DOCUMENTS

| | | | |
|---|---|---|---|
| 9,855,932 B2* | 1/2018 | Kato | B60T 13/74 |
| 11,884,260 B2* | 1/2024 | Dakemoto | B62D 6/003 |

(Continued)

FOREIGN PATENT DOCUMENTS

| | | | |
|---|---|---|---|
| JP | 2017-030472 A | 2/2017 | |
| JP | 2020-032894 A | 3/2020 | |

OTHER PUBLICATIONS

Feb. 28, 2024 Office Action issued in U.S. Appl. No. 17/674,026.
(Continued)

*Primary Examiner* — Jaime Figueroa
*Assistant Examiner* — Atticus A Cameron
(74) *Attorney, Agent, or Firm* — Oliff PLC

(57) ABSTRACT

A manager installed in a vehicle includes one or more processors. The one or more processors are configured to receive, from a plurality of advanced driver assistance system (ADAS) applications, a plurality of kinematic plans and identification information of the ADAS applications. The one or more processors are configured to arbitrate the kinematic plans, and calculate a motion request based on arbitration results. The one or more processors are configured to distribute the motion request to at least one actuator system. The one or more processors are configured to determine, when the kinematic plans include a request relating to stopped state holding of the vehicle, a mode of stopped state holding of the vehicle in accordance with the identification information of the ADAS applications.

8 Claims, 3 Drawing Sheets

(51) Int. Cl.
*B60W 10/184* (2012.01)
*B60W 30/09* (2012.01)
*B60W 30/12* (2020.01)
*B60W 30/16* (2020.01)
*B60W 50/00* (2006.01)
*B60W 60/00* (2020.01)

(56) References Cited

U.S. PATENT DOCUMENTS

| | | | |
|---|---|---|---|
| 2017/0029026 A1 | 2/2017 | Okuda et al. | |
| 2018/0375881 A1* | 12/2018 | Wada | H04W 4/48 |
| 2020/0070849 A1* | 3/2020 | Suzuki | B60W 40/109 |
| 2022/0274587 A1 | 9/2022 | Ohashi et al. | |
| 2022/0274616 A1 | 9/2022 | Miyake et al. | |

OTHER PUBLICATIONS

Mar. 28, 2024 Office Action issued in U.S. Appl. No. 17/590,967.
Jul. 17, 2024 Notice of Allowance issued in U.S. Appl. No. 17/590,967.

* cited by examiner

FIG. 2

| APPLICATION ID | STOPPED STATE HOLDING PROCESSING |
|---|---|
| 1 | FIRST MODE |
| 2 | SECOND MODE |
| 3 | THIRD MODE |
| 21 | FIRST MODE |
| ⋮ | ⋮ |

MANAGER, CONTROL METHOD, NON-TRANSITORY STORAGE MEDIUM, AND VEHICLE

CROSS-REFERENCE TO RELATED APPLICATION

This application claims priority to Japanese Patent Application No. 2021-025568 filed on Feb. 19, 2021, incorporated herein by reference in its entirety.

BACKGROUND

1. Technical Field

The present disclosure relates to a manager installed in a vehicle, a control method, a non-transitory storage medium, and the vehicle.

2. Description of Related Art

In recent years, a plurality of applications that realizes driver assistance functions (autonomous driving, automatic parking, etc.) have been implemented in vehicles. Japanese Unexamined Patent Application Publication No. 2020-032894 (JP 2020-032894 A) discloses a control device (manager) that receives requests output from each of the applications, arbitrates a plurality of requests received from the applications, and based on the arbitration results, outputs a request for driving an actuator (steering device, brake device, etc.).

SUMMARY

There are a plurality of such applications implemented in vehicles such as advanced driver assistance system (ADAS) applications that require the vehicle to be held in a stopped state. When the mode (device, mechanism, operation, etc.) of holding the stopped state of the vehicle is different in such ADAS applications, for example, a technique is conceivable in which each electronic control unit (ECU) that implements the ADAS application outputs each of a request relating to stopped state holding, and the mode thereof, to the manager. However, in this technique of causing each ECU to output the request relating to stopped state holding and the mode thereof, there is a possibility that the design of the ECU in which the ADAS application is implemented and the interface (I/F) will become complicated.

The present disclosure provides a manager, a control method, a non-transitory storage medium, and a vehicle, capable of realizing a mode of stopped state holding in accordance with a request from an application, without complicating design of ECUs in which the application is implemented and interfaces.

A manager according to a first aspect of the technology of the present disclosure is installed in a vehicle and includes one or more processors. The one or more processors are configured to receive, from a plurality of advanced driver assistance system applications, a plurality of kinematic plans and identification information of the advanced driver assistance system applications. The one or more processors are configured to arbitrate the kinematic plans, and calculate a motion request based on an arbitration result. The one or more processors are configured to distribute the motion request to at least one actuator system. The one or more processors are configured to determine, when the kinematic plans include a request relating to stopped state holding of the vehicle, a mode of stopped state holding of the vehicle in accordance with the identification information of the advanced driver assistance system applications.

In the manager according to the first aspect of the technology of the present disclosure, the request relating to stopped state holding of the vehicle may include an instruction for permitting or prohibiting actuation of at least one of a brake hold function, an electronic parking brake lock function, and a parking lock function. The manager according to the first aspect of the technology of the present disclosure may further include a storage configured to store the identification information of the advanced driver assistance system applications and information related to the mode of stopped state holding of the vehicle such that the identification information and the information related to the mode of stopped state holding of the vehicle are associated with each other. The one or more processors may be configured to, when the kinematic plans include a request relating to stopped state holding of the vehicle, determine the mode of stopped state holding of the vehicle in accordance with the identification information of the advanced driver assistance system applications, based on the information stored in the storage.

In the manager according to the first aspect of the technology of the present disclosure, the mode of stopped state holding of the vehicle may include at least one of a first mode, a second mode, and a third mode. The first mode may be a mode in which control of stopped state holding of the vehicle is executed in accordance with a driving operation of a driver only when there is intent of the driver to drive. The second mode may be a mode in which the control of stopped state holding of the vehicle is executed in accordance with the driving operation of the driver when there is intent of the driver to drive, and in which the control of stopped state holding of the vehicle is executed based on the motion request when there is no intent of the driver to drive. The third mode may be a mode in which the control of stopped state holding of the vehicle is executed based on the motion request, regardless of intent of the driver to drive and the driving operation of the driver. In the manager according to the first aspect of the technology of the present disclosure, the intent of the driver to drive may be determined based on at least one of an act engaging or disengaging a seat belt, and an act of opening or closing a vehicle door. In the manager according to the first aspect of the technology of the present disclosure, the driving operation of the driver may include an accelerator operation and a brake operation.

A control method according to a second aspect of the technology of the present disclosure is executed by a computer of a manager installed in a vehicle. The control method includes receiving, from a plurality of advanced driver assistance system applications, a plurality of kinematic plans and identification information of the advanced driver assistance system applications, arbitrating the kinematic plans, and determining, when the kinematic plans include a request relating to stopped state holding of the vehicle in the arbitrating, a mode of stopped state holding of the vehicle in accordance with the identification information of the advanced driver assistance system applications, calculating a motion request based on an arbitration result from the arbitrating, and distributing the motion request to at least one actuator system.

A non-transitory storage medium according to a third aspect of the technology of the present disclosure stores instructions that are executable by a computer of a manager installed in a vehicle and that cause the computer to perform the following functions. The functions include receiving, from a plurality of advanced driver assistance system applications, a plurality of kinematic plans and identification information of the advanced driver assistance system applications, arbitrating the kinematic plans, and determining, when the kinematic plans include a request relating to stopped state holding of the vehicle in the arbitrating, a mode of stopped state holding of the vehicle in accordance with the identification information of the advanced driver assistance system applications, calculating a motion request based on an arbitration result from the arbitrating, and distributing the motion request to at least one actuator system. A vehicle according to a fourth aspect of the technology of the present disclosure is the vehicle in which the manager as described above is installed.

According to the manager of the first aspect of the present disclosure, the control method of the second aspect, the non-transitory storage medium of the third aspect, and the vehicle of the fourth aspect, a mode of stopped state holding in accordance with a request from an application can be realized, without complicating design of ECUs in which the application is installed and interfaces.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is an example of stopped state holding processing information stored in a storage unit.

DETAILED DESCRIPTION OF EMBODIMENTS

A manager according to the present disclosure stores, in advance, a mode of stopped state holding processing of a vehicle requested by an application, in association with unique identification information imparted to the application. When requests for vehicle motion received from a plurality of applications include a request relating to stopped state holding of the vehicle, the manager determines the mode of stopped state holding of the vehicle in accordance with identification information of the application, based on the results of arbitrating a plurality of vehicle motion requests, and controls stopped state holding of the vehicle in the mode that is determined. An embodiment of the present disclosure will be described below in detail with reference to the drawings.

EMBODIMENT

Configuration

Figure 1:
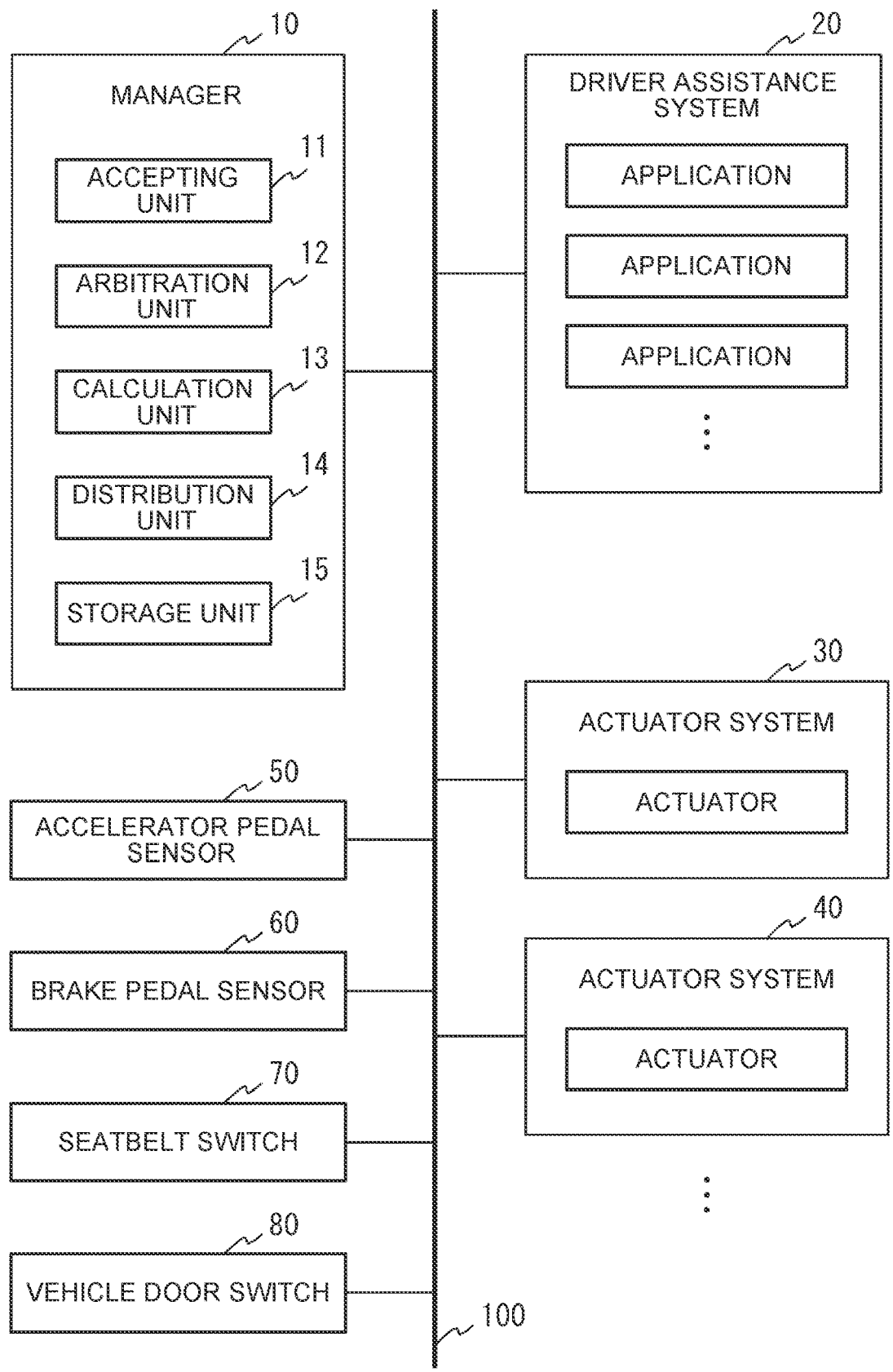
FIG. 1 is a configuration diagram of a manager according to an embodiment of the present disclosure and the surroundings thereof.

FIG. 1 is a diagram illustrating a configuration example of a manager 10 installed in a vehicle according to an embodiment of the present disclosure, and the surroundings thereof. The manager 10 illustrated in FIG. 1 is communicably connected to a driver assistance system 20, a plurality of actuator systems 30 and 40, an accelerator pedal sensor 50, a brake pedal sensor 60, a seatbelt switch 70, and a vehicle door switch 80, via an in-vehicle network 100. Examples of the in-vehicle network 100 include a Controller Area Network (CAN), Ethernet (registered trademark), and so forth.

The driver assistance system 20 is a configuration for realizing various types of functions for assisting driving of the vehicle, including at least drive control and braking control of the vehicle, by executing implemented applications. Examples of applications implemented by the driver assistance system 20 include an application that realizes autonomous driving functions, an application that realizes automatic parking functions, an advanced driver assistance systems (ADAS) application that realizes advanced driver assistance functions, and so forth. ADAS applications include applications that realize functions of collision avoidance assistance (pre-crash safety (PCS), etc.), applications that realize functions of following the vehicle in front (adaptive cruise control (ACC), etc.) for travelling while keeping the distance between the vehicle travelling ahead and the vehicle constant, applications that realize functions of lane keeping assistance (lane keeping assist (LKA), lane tracing assist (LTA), etc.) for maintaining the lane that the vehicle is traveling in, applications that realize functions of collision damage mitigation braking (automated emergency braking (AEB), etc.) for automatically braking to reduce damage in a collision, applications that realize functions of lane departure warning (LDW) (lane departure alert (LDA), etc.) for warning of the vehicle deviating from the lane that the vehicle is traveling in, and so forth.

Each application of the driver assistance system 20 outputs a request for a kinematic plan guaranteeing functionality (merchantability) of the application alone to the manager 10, as an application request, based on vehicle information (recognition sensor information, etc.) acquired (input) from various types of sensors and so forth that are omitted from illustration. This kinematic plan includes a request for longitudinal acceleration/deceleration generated in the vehicle, a request relating to stopped state holding of the vehicle, and so forth. Examples of requests relating to stopped state holding of the vehicle include instructions relating to permitting/forbidding of at least one operation of brake holding functions for holding hydraulic pressure to hold a braked state, electronic parking brake (EPB) lock functions for holding the braked state by pressing brake pads against disc rotors using an electric motor, and a parking lock (P lock) function for fixing the gearshift position to the parking position. Also, each application of the driver assistance system 20 outputs identification information (hereinafter referred to as "application ID"), which can uniquely identify its own application, to the manager 10 along with the kinematic plan. The application ID is uniquely set in advance for each application.

The driver assistance system 20 is realized by a computer such as an electronic control unit (ECU) having a processor such as a control processing unit (CPU), memory, and an input/output interface. Note that the number of applications implemented by the driver assistance system 20 is not limited in particular. Also, a separate ECU may be provided for each application in the driver assistance system 20. For example, the driver assistance system 20 may be configured by an autonomous driving ECU in which an autonomous driving application is implemented, an automatic parking ECU in which an automatic parking application is implemented, and an ADAS-ECU in which an advanced driver assistance application is implemented. Also, a plurality of ADAS applications may be implemented in a plurality of ECUs, such as an ECU in which an ADAS application that realizes ACC functions is implemented, an ECU in which an ADAS application that realizes an LKA function is implemented, and an ECU in which an ADAS application that realizes an AEB function is implemented.

The actuator systems 30 and the actuator system 40 are one of realization systems for realizing requests for kinematic plans output by the driver assistance system 20. As an example, the actuator system 30 includes a powertrain actuator (an engine, transmission, and so forth) capable of generating driving force in the vehicle, and controls the operations of the powertrain actuator, thereby realizing requests for kinematic plans. Also, as an example, the actuator system 40 includes a brake actuator (hydraulic brakes, electronic parking brakes, etc.) capable of generating braking force in the vehicle, and controls the operations of the brake actuator, thereby realizing requests for kinematic plans. Note that the number of actuator systems installed in the vehicle is not limited in particular.

The accelerator pedal sensor 50 is a sensor for detecting an accelerator operation amount, which is the amount of depression of the accelerator pedal operated by the driver of the vehicle. The brake pedal sensor 60 is a sensor for detecting a brake operation amount, which is the amount of depression of the brake pedal operated by the driver of the vehicle. The seatbelt switch 70 is a switch for detecting fastened/unfastened states of a seatbelt. The vehicle door switch 80 is a switch for detecting the open/closed state of the vehicle door. The accelerator pedal sensor 50 and the brake pedal sensor 60 are used to determine driving operations being performed by the driver. Also, the accelerator pedal sensor 50, the brake pedal sensor 60, the seatbelt switch 70, and the vehicle door switch 80 are used to determine whether the driver, described later, intends to drive the vehicle (including use without traveling) (hereinafter referred to as "intent of driver to drive").

The manager 10 determines control contents related to motion of the vehicle based on kinematic plan requests received from the driver assistance system 20, and outputs requests to the actuator system 30 and/or the actuator system 40 based on the determined control contents as necessary. Also, the manager 10 determines the mode of stopped state holding processing based on driver state and vehicle state, which can be acquired from an application ID acquired from the driver assistance system 20 along with a request for a kinematic plan, the accelerator pedal sensor 50, the brake pedal sensor 60, the seatbelt switch 70, the vehicle door switch 80, and so forth.

The manager 10 controls the movement of the vehicle, functioning as an ADAS manager (MGR) or a vehicle MGR or the like involved in so-called vehicle motion, or as a part of an ADAS MGR or a vehicle-MGR. The manager 10 includes a receiving unit 11, an arbitration unit 12, a calculation unit 13, a distribution unit 14, and a storage unit 15.

The receiving unit 11 receives a kinematic plan request and an application ID output by one or more applications of the driver assistance system 20. Examples of kinematic plans in the present embodiment include requests related to acceleration related to the front-rear direction (longitudinal direction) motion of the vehicle, and to stopped state holding of the vehicle. The request for the kinematic plan and the application ID received by the receiving unit 11 are output to the arbitration unit 12.

The arbitration unit 12 arbitrates requests for a plurality of kinematic plans from the applications of the driver assistance system 20 received by the receiving unit 11. Examples of the processing of this arbitration include one kinematic plan being selected from the kinematic plans based on a predetermined selection criterion. Further, a new kinematic plan can be set based on the kinematic plans, as processing of arbitration. Note that the arbitration unit 12 may arbitrate requests for the kinematic plans, based on information representing availability acquired from the actuator system 30 and the actuator system 40.

Further, the arbitration unit 12 determines the mode of stopped state holding processing related to the holding control of the stopped state of the vehicle, in accordance with applications requesting arbitrated kinematic plans. This determination is made based on stopped state holding processing information stored in the later-described storage unit 15. Further, the arbitration unit 12 suitably determines whether the mode of stopped state holding processing according to the driver state and the vehicle state is to be temporarily prioritized over the mode of stopped state holding processing determined based on the arbitration results (arbitration of mode). Determination of the mode of stopped state holding processing and determination of priority will be described later.

The calculation unit 13 calculates the motion request based on the arbitration results of the request for the kinematic plan and the mode of stopped state holding processing determined based on the arbitration results at the arbitration unit 12. This motion request is a physical quantity for controlling the actuator system 30 and/or the actuator system 40, and is different from the physical quantity of the request for the kinematic plan. For example, when the request for the kinematic plan (first request) is acceleration, driving force and driving torque can be calculated as the motion request (second request). Thus, the request for acceleration is converted into a request for driving force and driving torque.

The distribution unit 14 distributes the motion request calculated by the calculation unit 13 to at least one actuator system 30 and/or actuator system 40.

The storage unit 15 stores information (stopped state holding processing information) indicating a mode of vehicle stopped state holding processing suitable for each application, for the applications implemented in the driver assistance system 20. FIG. 2 is an example of stopped state holding processing information stored in the storage unit 15. The mode of stopped state holding processing (one of first mode, second mode, and third mode) applied as a default when the kinematic plan of the application to which the application ID is assigned is arbitrated is associated and stored for each application ID in this stopped state holding process information, as shown in FIG. 2. These modes are set in advance, based on the contents of requests of the applications, and the perspective of safety design.

For example, the first mode may be a mode in which the driver is the main authority of vehicle control, and stopped state holding control is executed according to driving operations performed by the driver only when determining that the driver has intent to drive the vehicle. The intent of the driver to drive the vehicle can be determined based on, for example, at least one of an act of fastening/unfastening a seat belt and an act of opening/closing the vehicle door. Examples of driving operations of the driver that involve stopped state holding of the vehicle include depressing the brake pedal, operating the parking brake, and so forth. In this first mode, the stopped state of the vehicle is maintained by using the largest braking force among a plurality of braking forces each required based on the arbitration results by the arbitration unit 12 and the amount of brake operations performed by the driver. During this stopped state holding, unnecessary actuators are inactive.

Also, for example, the second mode may be a mode in which, when it is determined that the driver has intent to drive the vehicle, the driver is the main authority of the vehicle control, and control of stopped state holding of the vehicle is executed in accordance with operations performed by the driver, and when it is determined that the driver has no intent to drive the vehicle, the advanced safety functions installed in the vehicle are the main authority of vehicle control, and control of stopped state holding of the vehicle determined by the advanced safety functions is executed. In this second mode, when the stopped state holding control is executed with the advanced safety functions as the main authority of vehicle control, the stopped state of the vehicle is held by actuation of EPB locking.

Further, for example, the third mode may be a mode in which the advanced safety functions installed in the vehicle are the main authority of vehicle control, regardless of intent of the driver to drive the vehicle, and control of stopped state holding of the vehicle determined by the advanced safety functions is executed. In this third mode, the stopped state of the vehicle is maintained by actuation of EPB locking or actuation of P locking.

The contents and the classifications of the first mode, the second mode, and the third mode described above are exemplary, and can be changed, added, and so forth, according to the contents of requests from the applications implemented in the driver assistance system 20, variations in the driver state and the vehicle state, and so forth.

Note that the configurations of the equipment installed in the vehicle and the configuration of the manager 10 described above are exemplary, and additions, substitutions, changes, omissions, and so forth, can be made as appropriate. Also, the functions of each piece of equipment can be implemented by integration into one piece of equipment or distribution between or among a plurality of pieces of equipment, as appropriate. For example, out of the functions of the arbitration unit 12 of the manager 10, the function of determining the mode of stopped state holding processing of the vehicle may be implemented in another piece of equipment different from the manager 10, or may be implemented in the actuator system 30 and/or the actuator system 40. Further, the manager 10 can be installed in a brake ECU.

Control

Figure 3:
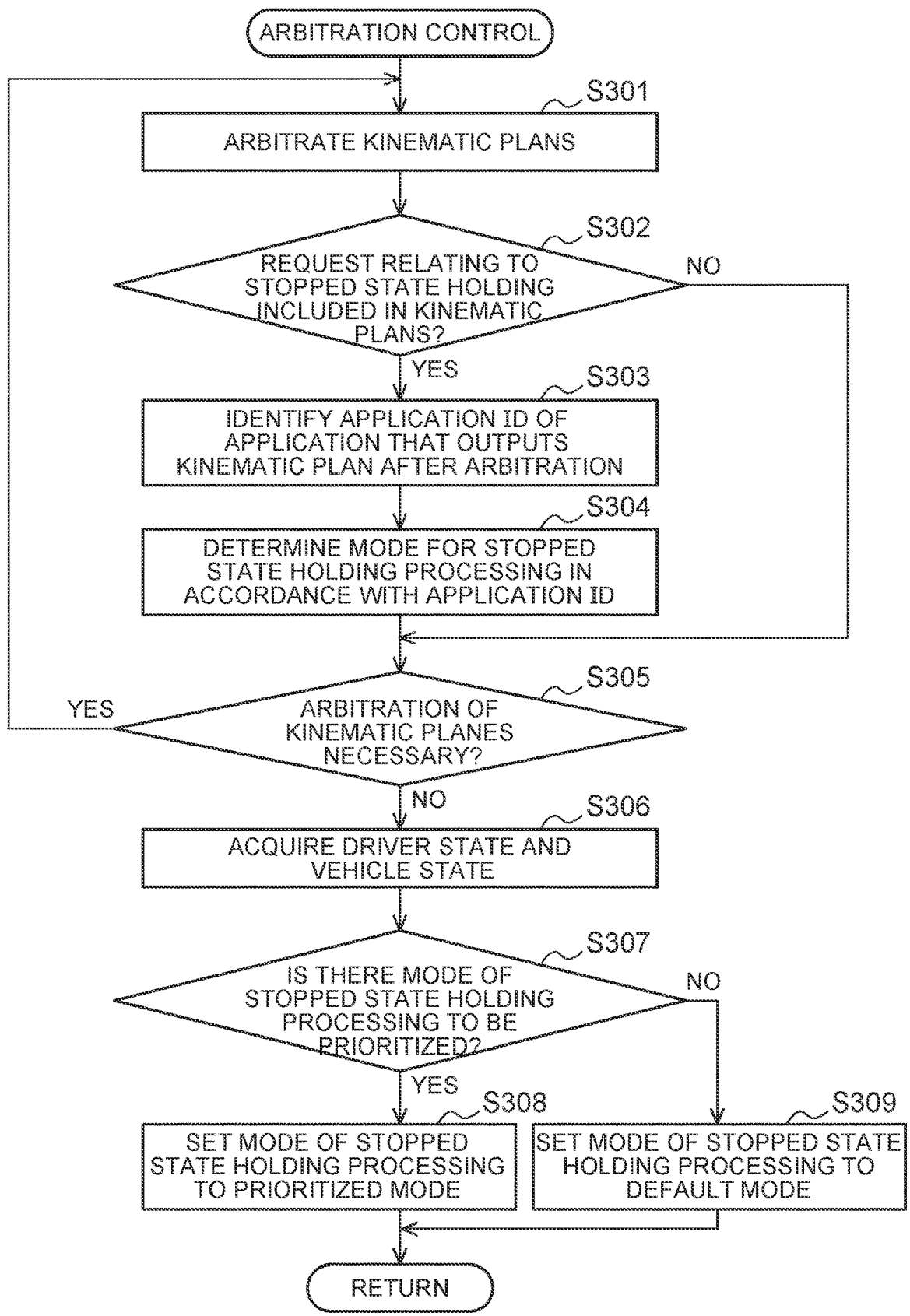
FIG. 3 is a flowchart of a processing procedure of arbitration control executed by an arbitration unit of the manager.

The arbitration control executed by the manager 10 according to the present embodiment will be described with reference to FIG. 3. FIG. 3 is a flowchart showing processing procedures of arbitration control executed by the arbitration unit 12 of the manager 10.

The arbitration control shown in FIG. 3 is started when the receiving unit 11 of the manager 10 receives a request for a kinematic plan (acceleration) from an application of the driver assistance system 20.

Step S301

The arbitration unit 12 arbitrates the kinematic plan requested by the application. In this embodiment, an example is shown in which arbitration is performed with one kinematic plan being selected out of the kinematic plans requested by each of the applications. When the kinematic plan is arbitrated, the processing proceeds to step S302.

Step S302

The arbitration unit 12 determines whether the kinematic plan requested by the application includes a request relating to stopped state holding of the vehicle. When the kinematic plan includes a request relating to stopped state holding of the vehicle (YES in step S302), the processing proceeds to step S303, and when the kinematic plan does not include a request relating to stopped state holding of the vehicle (NO in step S302), the processing proceeds to step S305.

Step S303

The arbitration unit 12 identifies the application ID imparted to the application outputting the request for the kinematic plan following arbitration. When the application ID of the application is identified, the processing proceeds to step S304.

Step S304

The arbitration unit 12 determines the mode of stopped state holding processing to be applied to vehicle control, in accordance with the identified application ID. This determination is made based on stopped state holding processing information stored in the storage unit 15. For example, when the stopped state holding processing information is the information shown in FIG. 2, and the identified application ID is "1", applying the "first mode" is determined for the stopped state holding processing. After this determination, the manager 10 (or a configuration other than the manager 10) carries out the control relating to the holding of the stopped state of the vehicle, in accordance with the contents defined in the determined mode. When the mode of stopped state holding processing is determined, the processing proceeds to step S305.

Step S305

The arbitration unit 12 determines whether arbitration of the kinematic plan requested by the application is necessary. A case in which arbitration of this kinematic plan is necessary, for example, is when a new kinematic plan is requested from one or more applications, and arbitration of the kinematic plan needs to be performed again, when a predetermined timing has arrived to review the arbitration of the kinematic plan, or the like. When it is determined that the arbitration of the kinematic plan is necessary (YES in step S305), the processing proceeds to step S301, and when it is determined that arbitration of the kinematic plan is not necessary (NO in step S305), the processing proceeds to step S306.

Step S306

The arbitration unit 12 acquires the driver state and the vehicle state from the equipment installed in the vehicle (equipment illustrated and equipment omitted from illustration). An example of the driver state is the consciousness state of the driver. An example of the vehicle state is the stopped time of the vehicle. When the driver state and the vehicle state are acquired, the processing proceeds to step S307.

Step S307

The arbitration unit 12 determines whether there is a mode of stopped state holding processing that is to be prioritized, regardless of the mode of stopped state holding processing currently applied to the vehicle control by the determination based on the arbitration results. This determination is made based on the driver state and the vehicle state. As an example, a case will be considered in which the driver is unconscious (due to dozing off or the like) and unintentionally depresses the accelerator pedal in a state in which the vehicle is stopped and controlled in the first mode, in which the driver is the main authority, such as when the ACC is activated. In this case, predetermined in-vehicle equipment detects the driver's loss of consciousness and requests the arbitration unit 12 for the third mode, in which the advanced safety functions are the main authority of vehicle control. The arbitration unit 12 determines that the current state is a state in which the third mode should be temporarily prioritized based on the request from the predetermined in-vehicle equipment, and switches the mode of stopped state holding processing from the first mode to the third mode (mode arbitration). By switching the modes, control in which accelerator pedal operations by the driver are invalidated is carried out. Thus, holding of the stopped state of the vehicle can be safely maintained. Note that this mode switching does not rewrite the stopped state holding processing information stored in the storage unit 15, but temporarily changes the mode of stopped state holding processing determined based on the arbitration results. Accordingly, when the driver state and the vehicle state are restored to the original states, for example, control is continued by returning to the mode of stopped state holding processing determined based on the arbitration results. When it is determined that there is a mode of stopped state holding processing to be prioritized (YES in step S307), the processing proceeds to step S308, and when it is determined that there is no mode of stopped state holding processing to be prioritized (NO in step S307), the processing proceeds to step S309.

Step S308

The arbitration unit 12 sets the mode of stopped state holding processing, to be applied to vehicle control, to the mode of stopped state holding processing regarding which determination has been made in the above step S307 that prioritization is necessary, and ends this routine.

Step S309

The arbitration unit 12 sets the mode of stopped state holding processing, to be applied to vehicle control, to the mode of stopped state holding processing based on the arbitration results determined in step S304 (default mode of stopped state holding processing), and ends this routine.

Operations and Effects

As described above, according to an embodiment of the present disclosure, the stopped state holding processing information, in which the mode of stopped state holding processing of the vehicle requested by the ADAS application is associated with the unique application ID imparted to the ADAS application, is stored in the manager in advance. When requests for kinematic plans received from the ADAS applications include a request relating to stopped state holding of the vehicle, the manager determines the mode of stopped state holding of the vehicle in accordance with the application IDs, based on the results of arbitrating the kinematic plans, and controls stopped state holding of the vehicle in the mode that is determined.

Thus, the manager can suitably determine the mode of stopped state holding of the vehicle by simply referring to the stopped state holding processing information stored in its own storage unit, without giving consideration to the ADAS application implemented in the vehicle (driver assistance system). Accordingly, a mode of stopped state holding can be realized that corresponds to a request from the application, without complicating the designs of the ECU in which the application is installed and the interface. Also, the communication load between the ADAS applications and the manager can be reduced, and functional interference among the ADAS applications can be suppressed.

Also, the manager centrally manages the mode of stopped state holding of the vehicle, and accordingly when a new ADAS application is implemented in the vehicle, all that is necessary is to add data, in which the application ID of the ADAS application and the mode are associated, to the stopped state holding processing information. Further, even when an ADAS application that cannot be handled by existing modes is newly implemented in the vehicle, the new mode can be supported by defining the new mode and performing reflection thereof in the stopped state holding processing information.

Although an embodiment of the technology according to the present disclosure has been described above, the present disclosure is not limited to a manager installed in a vehicle, and can be understood as being a control system including a manager, a control method executed by a manager including a processor and memory, a control program, a computer-readable non-transitory storage medium storing the control program, a vehicle provided with the manager, and so forth.

The present disclosure is useful in managers and the like installed in vehicles and so forth.

What is claimed is:

1. A manager installed in a vehicle, the manager comprising:
a storage storing identification information of advanced driver assistance system applications and information related to a mode of stopped state holding of the vehicle such that the identification information of the advanced driver assistance system applications and the information related to the mode of stopped state holding of the vehicle are associated with each other; and
one or more processors configured to:
receive, from a plurality of advanced driver assistance system applications, a plurality of kinematic plans and the identification information of the advanced driver assistance system applications,
arbitrate the kinematic plans and generating an arbitration result including at least one selected kinematic plan of the plurality of kinematic plans,
calculate a motion request based on the arbitration result,
distribute the motion request to at least one actuator system,
determine, when the at least one selected kinematic plan includes a request relating to stopped state holding of the vehicle, the mode of stopped state holding of the vehicle based on the stored associations between the identification information of the advanced driver assistance system applications and the information related to the mode of stopped state holding of the vehicle.

2. The manager according to claim 1, wherein the request relating to stopped state holding of the vehicle includes an instruction for permitting or prohibiting actuation of at least one of a brake hold function, an electronic parking brake lock function, and a parking lock function.

3. The manager according to claim 1, wherein the mode of stopped state holding of the vehicle includes at least one of a first mode, a second mode, and a third mode, the first mode being a mode in which control of stopped state holding of the vehicle is executed in accordance with a driving operation of a driver only when there is intent of the driver to drive, the second mode being a mode in which the control of stopped state holding of the vehicle is executed in accordance with the driving operation of the driver when there is intent of the driver to drive, and in which the control of stopped state holding of the vehicle is executed based on the motion request when there is no intent of the driver to drive, and the third mode being a mode in which the control of stopped state holding of the vehicle is executed based on the motion request, regardless of intent of the driver to drive and the driving operation of the driver.

4. The manager according to claim 3, wherein the intent of the driver to drive is determined based on at least one of an act engaging or disengaging a seat belt and an act of opening or closing a door of the vehicle.

5. The manager according to claim 3, wherein the driving operation of the driver includes an accelerator operation and a brake operation.

6. A control method executed by a computer of a manager installed in a vehicle, the control method comprising:
   storing identification information of advanced driver assistance system applications and information related to a mode of stopped state holding of the vehicle such that the identification information of the advanced driver assistance system applications and the information related to the mode of stopped state holding of the vehicle are associated with each other;
   receiving, from a plurality of advanced driver assistance system applications, a plurality of kinematic plans and the identification information of the advanced driver assistance system applications;
   arbitrating the kinematic plans, and generating an arbitration result including at least one selected kinematic plan of the plurality of kinematic plans,
   determining, when the at least one selected kinematic plan includes a request relating to stopped state holding of the vehicle in the arbitrating, the mode of stopped state holding of the vehicle based on the stored associations between the identification information of the advanced driver assistance system applications and the information related to the mode of stopped state holding of the vehicle;
   calculating a motion request based on the arbitration result from the arbitrating; and
   distributing the motion request to at least one actuator system.

7. A non-transitory storage medium storing instructions that are executable by a computer of a manager installed in a vehicle and that cause the computer to perform functions comprising:
   storing identification information of advanced driver assistance system applications and information related to a mode of stopped state holding of the vehicle such that the identification information of the advanced driver assistance system applications and the information related to the mode of stopped state holding of the vehicle are associated with each other;
   receiving, from a plurality of advanced driver assistance system applications, a plurality of kinematic plans and the identification information of the advanced driver assistance system applications;
   arbitrating the kinematic plans, and generating an arbitration result including at least one selected kinematic plan of the plurality of kinematic plans,
   determining, when the at least one selected kinematic plan includes a request relating to stopped state holding of the vehicle in the arbitrating, the mode of stopped state holding of the vehicle based on the stored associations between the identification information of the advanced driver assistance system applications and the information related to the mode of stopped state holding of the vehicle;
   calculating a motion request based on an arbitration result from the arbitrating; and
   distributing the motion request to at least one actuator system.

8. The vehicle in which the manager according to claim 1 is installed.

* * * * *